US 12,475,167 B2

(12) United States Patent
Jiang et al.

(10) Patent No.: US 12,475,167 B2
(45) Date of Patent: *Nov. 18, 2025

(54) EFFICIENT HASH TABLE LOOKUP

(71) Applicant: Google LLC, Mountain View, CA (US)

(72) Inventors: Weiwei Jiang, Santa Clara, CA (US); Srinivas Vaduvatha, San Jose, CA (US); Prashant R. Chandra, San Jose, CA (US); Jiazhen Zheng, Santa Clara, CA (US); Hugh McEvoy Walsh, Los Gatos, CA (US); Weihuang Wang, Los Gatos, CA (US); Abhishek Agarwal, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/423,766

(22) Filed: Jan. 26, 2024

(65) Prior Publication Data

US 2024/0168996 A1     May 23, 2024

Related U.S. Application Data

(63) Continuation of application No. 17/833,126, filed on Jun. 6, 2022, now Pat. No. 11,914,647.

(51) Int. Cl.
*G06F 16/901* (2019.01)
*G06F 3/06* (2006.01)

(52) U.S. Cl.
CPC ........ *G06F 16/9014* (2019.01); *G06F 3/0613* (2013.01); *G06F 3/0659* (2013.01); *G06F 3/0673* (2013.01); *G06F 16/9017* (2019.01)

(58) Field of Classification Search
None
See application file for complete search history.

(56) References Cited

U.S. PATENT DOCUMENTS

| 11,977,482 | B2* | 5/2024 | Xu ..................... G06F 21/6227 |
| 2005/0141519 | A1 | 6/2005 | Rajgopal et al. |
| 2007/0286194 | A1 | 12/2007 | Shavitt et al. |
| 2017/0270119 | A1* | 9/2017 | Kfir ..................... H04L 9/0894 |
| 2019/0220190 | A1 | 7/2019 | He et al. |
| 2019/0238459 | A1 | 8/2019 | Shmilovici |
| 2020/0067882 | A1 | 2/2020 | Chapel et al. |

FOREIGN PATENT DOCUMENTS

EP          3057272 A1     8/2016

OTHER PUBLICATIONS

Extended European Search Report for European Patent Application No. 22207736.4 dated May 19, 2023. 13 pages.

* cited by examiner

*Primary Examiner* — Charles J Choi
(74) *Attorney, Agent, or Firm* — Lerner David LLP

(57) ABSTRACT

A hash table system, including a plurality of hash tables, associated with respective hash functions, for storing key-value pairs; an overflow memory for storing key-value pairs moved from the hash tables due to collision; and an arbiter for arbitrating among commands including update commands, match commands, and rehash commands, wherein for each system clock cycle, the arbiter selects as a selected command one of an update command, a match command, or a rehash command, and wherein the hash table system completes execution of each selected command within a bounded number of system clock cycles.

12 Claims, 4 Drawing Sheets

EFFICIENT HASH TABLE LOOKUP

CROSS-REFERENCE TO RELATED APPLICATIONS

The present application is a continuation of U.S. patent application Ser. No. 17/833,126, filed on Jun. 6, 2022, the disclosure of which is hereby incorporated herein by reference.

BACKGROUND

Content Addressable Memory architectures may be employed in systems that require rapid data search. Content Addressable Memories (CAMs) can be searched very quickly due to their parallel nature. However, CAMs are expensive in terms of chip area and power consumption. Accordingly, for many applications CAMs are impractical.

BRIEF SUMMARY

It has been recognized that in many applications replacing a CAM with an efficient hash table lookup engine provides for rapid data search while overcoming the chip area and power consumption drawbacks associated with attempting to implement a large-scale CAM.

It has been further recognized that employing an efficient hash lookup table in a packet-based communication node would improve the speed and efficiency of the node. For example, a chip-based packet node, such as an ASIC, may employ a combination of an on-chip cache memory and an off-chip memory to temporarily store packets while the packets await processing; and when such node needs to access a temporarily stored packet, an efficient hash table lookup engine will enable the node to rapidly determine whether the packet is stored in the on-chip cache memory or in the off-chip memory.

In view of the desire for an efficient hash table lookup engine, the presently disclosed technology is provided.

In one aspect, the technology provides a hash table system, including a plurality of hash tables, associated with respective hash functions, for storing key-value pairs; an overflow memory for storing key-value pairs moved from the hash tables due to collision; and an arbiter for arbitrating among commands including update commands for installing key-value pairs into the hash tables or uninstalling key-value pairs from the hash tables, match commands for matching keys to locations in the hash tables, and rehash commands for relocating key-value pairs from the overflow memory to the hash tables or relocating key-value pairs from one of the hash tables to another of the hash tables, wherein for each system clock cycle, the arbiter selects as a selected command one of an update command, a match command, or a rehash command, and wherein the hash table system completes execution of each selected command within a bounded number of system clock cycles.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure describes a hardware architecture of a high-performance and low-cost hash table lookup engine. The design has a high throughput. The install and lookup operations are completed within a fixed bounded number of cycles. Also, a dynamic minimum bandwidth is allocated for background rehashing in order to keep a low stash occupancy. In addition, the design unifies the data path for all types of operations—install/uninstall, lookup and rehash—and enables a simple and efficient design.

Figure 1:
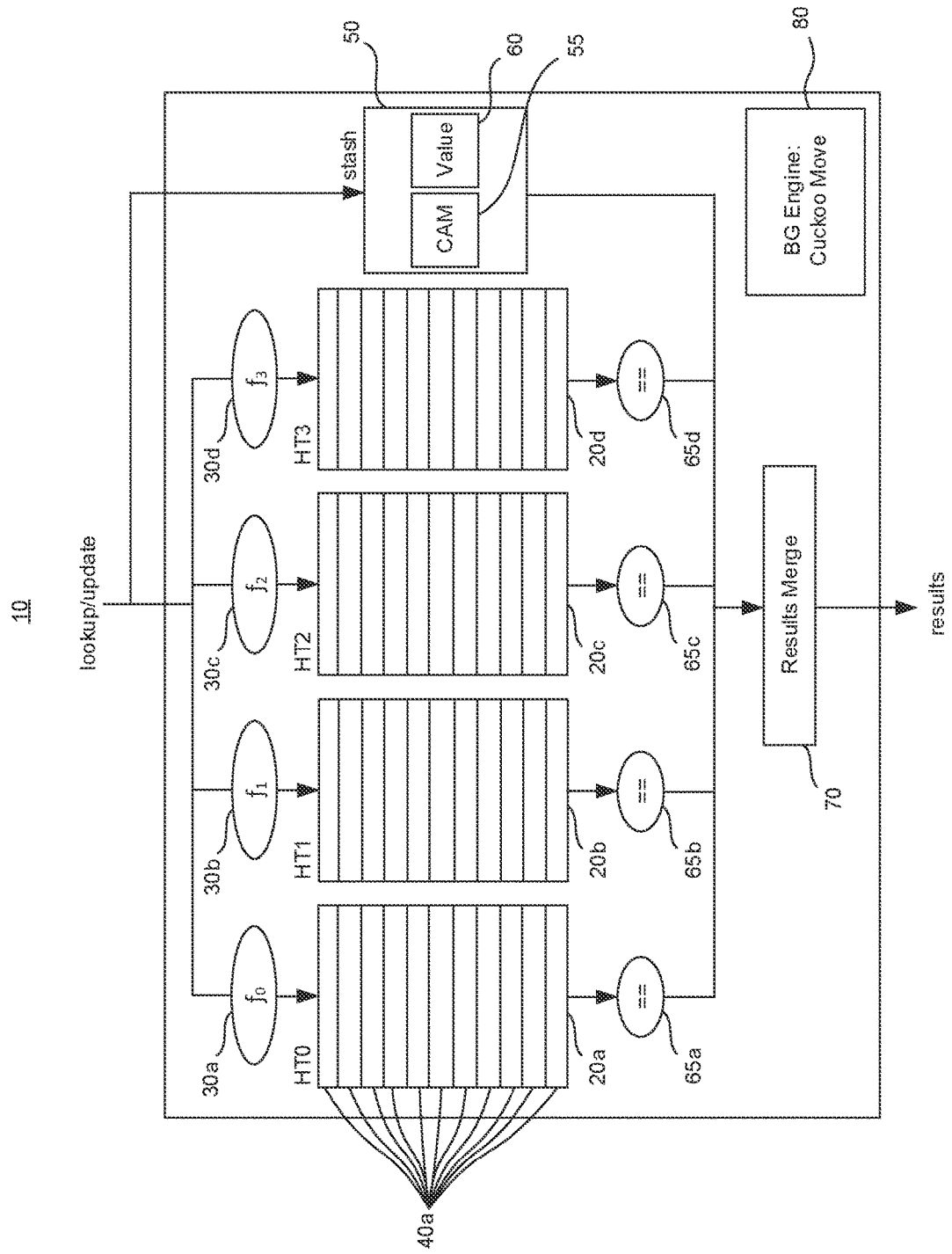
FIG. 1 is a high-level block diagram of a hash table system of an embodiment.

FIG. 1 is a high-level block diagram of a hash table system 10 of an embodiment. The system 10 implements a multi-way hash-table using a multiple of hash tables 20a, 20b, 20c, and 20d. The hash tables 20a-20d may be, for example, Static Random-Access Memories (SRAMs) such that each hash table is formed as one SRAM. In the figure, a 4-way hash system is shown, in which there are four hash tables, although the presently disclosed technology is not limited to 4-way systems and the technology may be implemented using more than four hash tables or fewer than four hash tables. Also, in the configuration of FIG. 1, the hash tables 20a-20d are of equal size, i.e., the hash tables 20a-20d have the same number of hash entries, although the presently disclosed technology is not limited to hash tables of equal size. In any event, the hash tables 20a-20d are associated with respective hash functions 30a, 30b, 30c, and 30d, with the hash functions 30a-30d being different from each other. Each hash table 20a-20d includes a multiple of buckets, e.g., buckets 40a of hash table 20a. The buckets, e.g., buckets 40a, are used to store key-value pairs, with the key of a key-value pair hashing to a bucket in each of the hash tables 20a-20d based on the respective corresponding one of the hash functions 30a-30d. Thus, for example, when hash function 30a is applied to a key of a key-value pair, one of buckets 40a is determined for the key-value pair.

Figure 2:
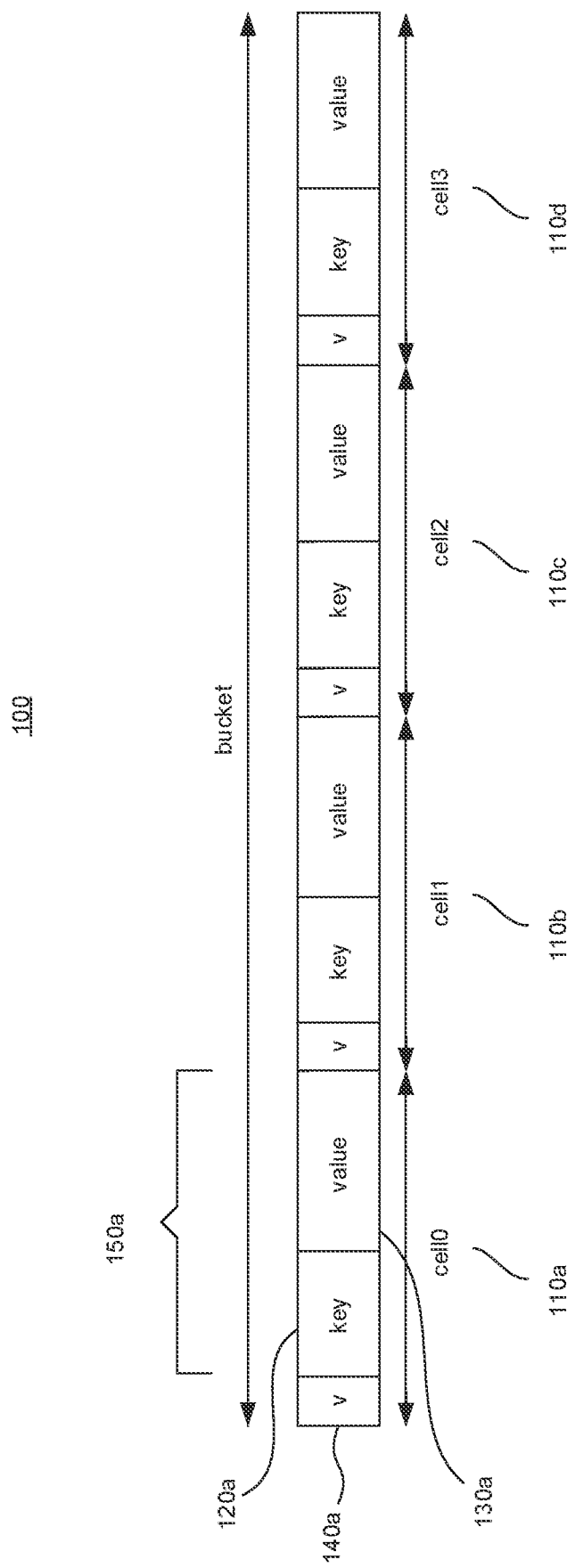
FIG. 2 is a block diagram of a bucket used in the hash table system of FIG. 1 according to an embodiment.

The buckets are configurable. For example, a bucket may be configured to store one or a multiple of key-value pairs. FIG. 2 is a block diagram of an example embodiment of a bucket 100 that may be employed as the form for all of the buckets in the hash tables 20a-20d of FIG. 1, although the present technology is not restricted to hash tables having bucket formats that are the same, and any two or more of the hash tables may have bucket formats that are different from each other. As can be seen from FIG. 2, the bucket 100 may be made up of four cells 110a, 110b, 110c, and 110d, although the present technology is not restricted to four cells per bucket, and a bucket may have one or more cells. Each of the cells 110a-110d is configured to store a key-value pair and an associated valid bit, the valid bit indicating whether or not the cell is in use. When a key-value pair is installed in a cell, the valid bit for the cell is set, e.g., from 0 to 1. On the other hand, when a key-value pair is uninstalled from a cell, the valid bit for the cell is reset, e.g., from 1 to 0. For instance, when key 120a and value 130a are stored in cell 110a, valid bit 140a is set to 1, with key 120a and value 130a making up a key-value pair 150a.

In an embodiment, the key-value pairs are packet identifier-cache memory address pairs. In such embodiment, the packet identifier may be a unique identifier including a connection ID and a sequence number, and the value may be a cache memory address. For purposes of concise explanation, the present description will be provided in the context of the key-value pairs being packet identifier-cache memory address pairs, with the understanding that the present technology is not restricted to the key-value pairs being packet identifier-cache memory address pairs. Upon reviewing this disclosure, one skilled in the art will readily appreciate the wide range of key-value pair types to which the technology is applicable.

Referring back to FIG. 1, for an "install" operation in the FIG. 1 system, each of hash tables 20a-20d independently computes its own location to store a new key-value pair. One of the hash tables 20a-20d is selected to store the new key-value pair based on a set of rules. A collision can occur when, for all of the hash tables 20a-20d, the bucket to which the new-key value hashes is full. In that case, an existing key-value pair is selected and replaced by the new key-value pair. The evicted key-value pair will be stored into a stash 50 (or "overflow memory"), thereby freeing up a cell for the new key-value pair.

The stash 50 is implemented using a CAM 55 and a value memory 60. The content addressable memory stores keys which correspond on a one-to one basis with values stored in the value memory 60 of the stash 50. The value memory may take the form of an SRAM, for example.

Both the hash tables 20a-20d and stash 50 are oversubscribed. The hash tables 20a-20d are oversubscribed to ensure a low collision rate. The stash 50 is oversubscribed to ensure capacity for handling collisions. For example, the hash tables 20a-20d and stash 50 are sized so that, for each of the hash tables 20a-20d and for the stash 50, the occupancy is <80% in a worst case scenario.

For a "match" operation, all of the hash tables 20a-20d perform a hash search in parallel. If the stash 50 is not empty, a search is also needed for the CAM 55. Then all search results are merged to produce the final match result according to comparison elements 65a, 65b, 65c, and 65d and a merge element 70. The elements 65a-65d and 70, may take the form of hardware, software, or firmware.

When a key to be matched is supplied to hash functions 30a-30d, the key is respectively hashed by the hash functions 30a-30d, and a bucket is returned for each of the hash tables 20a-20d. The elements 65a-65d respectively compare the returned bucket for each of the hash tables 20a-20d to the key to determine if the returned bucket includes a valid cell in which the key of the stored key-value pair matches the key being searched. Further, the stash 50 is also searched for the key. The element 70 merges the results of the searches of the hash tables 20a-20d and stash 50 and returns the value corresponding to the key being searched if the key is found in the hash tables 20a-20d or stash 50.

A background rehash engine 80 utilizes idle cycles to (i) move key-value pairs in the stash 50 back to the hash tables 20a-20d, and (ii) perform rebalancing of the hash tables 20a-20d.

The hash-table system 10 of FIG. 1 provides for quick and efficient lookup of key-value pairs. For example, in the packet cache application, when there is a need to find a packet in the cache memory, a packet identifier (key) for the packet can be hashed to determine a bucket in which the corresponding packet identifier-cache memory address pair (key-value pair) is located, and the cache memory address can be accessed from the bucket. In the case of buckets having multiple cells, a determined bucket can be searched according to the packet identifier (key) to locate the desired packet identifier-cache memory address pair (key-value pair).

Figure 3:
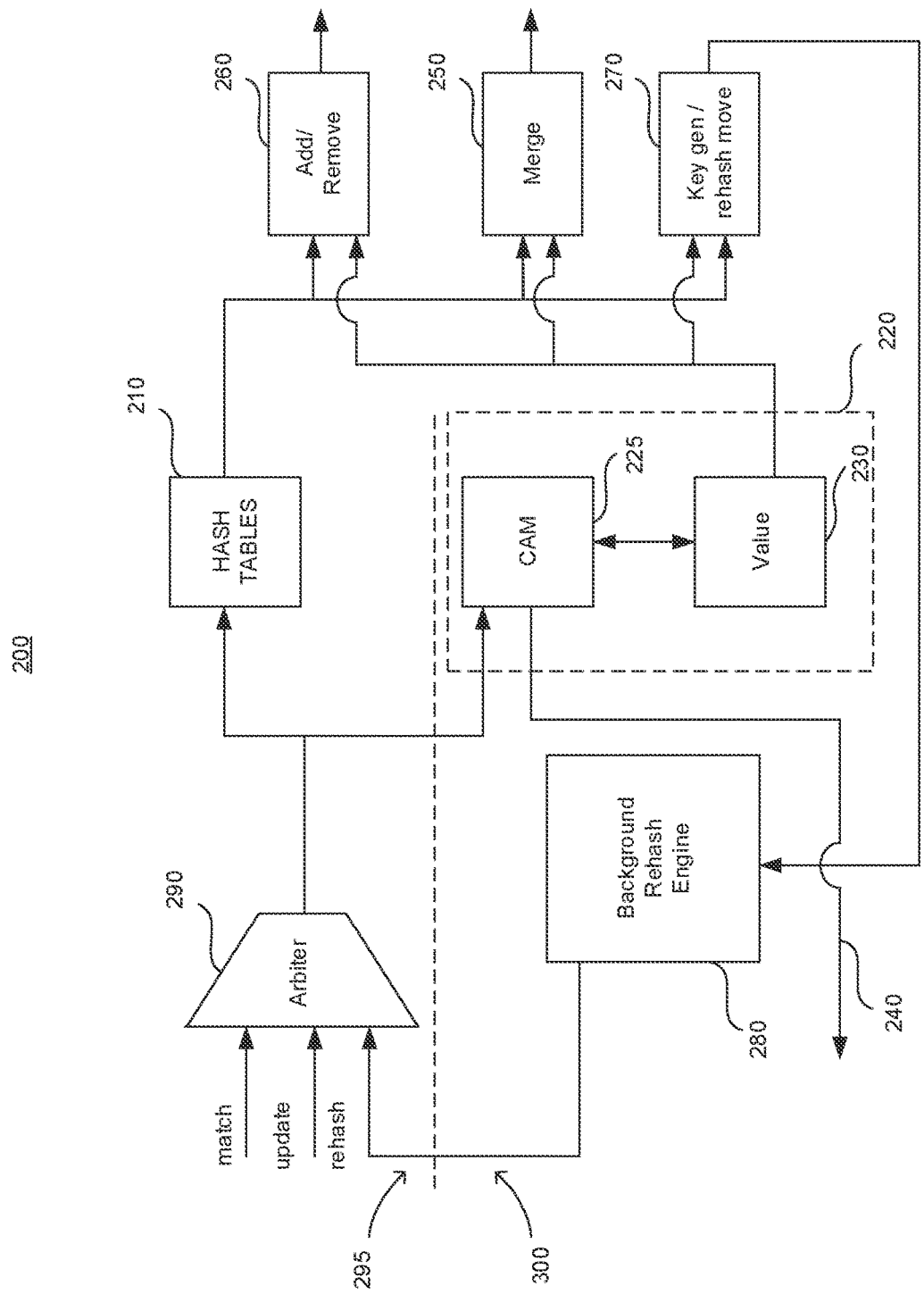
FIG. 3 is a block diagram of a hash table system of an embodiment.

Turning now to FIG. 3, the figure shows a block diagram of a hash table system 200 of an embodiment. As can be seen from the figure, system 200 includes hash tables 210 and a stash (or overflow memory) 220, the stash 220 including a CAM 225 and a value memory 230. In some embodiments, the hash tables 210 may take the form of hash tables 20a-20d of the FIG. 1 system, the stash 220 may take the form of stash 50 of the FIG. 1 system, and the CAM 225 and value memory may respectively take the form of CAM 55 and value memory 60 of the FIG. 1 system. The CAM 225 stores keys while the value memory 230 stores values. The CAM 225 and the value memory 230 may have the same number of entries (i.e., depth). For a key-value pair, the key and the value are stored separately in those two memories, but at the same address. The occupancy of stash 220 may also be provided as an output of system 200, as indicated by output 240, so that the users are notified when the stash 220 is almost full and can slow down the input rate. Further, each of hash tables 210, CAM 225 and value memory 230 provide for bypassing to ensure all write (and update) operations issued to the memories in the past (even a cycle before) are reflected in the output. Effectively, bypassing logic resolves data dependency hazards and avoids pipeline stalls.

The system 200 includes three combinational blocks. The combinational blocks are a merge block 250, and add/remove block 260, and a key generate/rehash move block 270. The merge block is for merging the results of hash searches of hash tables 210 and stash searches of stash 220 and producing final hit/miss result for each match command. The add/remove block 260 is used only for update operations. The add/remove block 260 calculates where a new key-value pair will be stored in the case of an install operation, or invalidates a key-value cell or a stash entry (e.g., one of cells 110a-110d or an entry in stash 220) in the case of an uninstall operation. The updated information (e.g., bucket data with a newly added cell or with an invalidated cell, or a new stash entry or invalidated stash entry) is then written back to the appropriate memory (e.g., one of hash tables 210 or stash 220). The key generate-rehash move block 270 is used for rehashing operations. The key generate-rehash move block 270 either produces new rehash key candidates, or actually performs rehash moves to move the location of a particular key-value pair.

The system 200 includes a background rehash engine 280. The background rehash engine 280 (or background engine)

generates candidate keys for rehashing. It is an isolated module and can be upgraded independently.

System 200 has a unified data path and is strictly pipelined. In each clock cycle of the system 200, a command of one of three types "match," "update," and "rehash" is allowed to enter the system 200 through an arbiter 290. Simultaneously, in each clock cycle, one command is committed and exits the system 200 through one of combinational blocks 250-270. The system 200 has a top-path pipeline 295 and a bottom-path pipeline 300. The top-path pipeline 295 is responsible for hash table 210 reads and writes, while the bottom-path pipeline 300 handles stash 220 reads and writes. These two pipelines have the same latency. After a command enters the unit, it forks and proceeds in both pipelines in parallel. At the end, one of the three combinational blocks 250-270 is activated, depending on the type of command. Thus, the arbiter 290 selects, as a selected command for each system clock cycle, one of an update command, a match command, or a rehash command; and the hash table system 200 completes execution of each selected command within a bounded number of system clock cycles.

The arbiter 290 may be implemented using a weighted arbiter. The following table shows an example of parameters on which operation of the arbiter 290 may be based.

| Parameter name | Default Value | Explanation |
| --- | --- | --- |
| stash_watermark_1 | Half of the stash size | Config register. Stash 'high occupied' threshold. |
| stash_watermark_2 | 3/4 of the stash size | Config register. Stash 'almost full' threshold. |
| Non-rehash command weight (normal mode) | 16 | Config register. The weight for non-rehash commands in normal mode, assuming rehash commands have a weight of 1 (i.e., 1/17 of the commands are for rehashing) |
| Non-rehash command weight (stash high occupied) | 4 | Config register. The weight for non-rehash commands when stash is highly occupied, assuming rehash commands have a weight of 1 (i.e., 20% of the commands are for rehashing) |
| Non-rehash command weight (stash almost full) | 1 | Config register. The weight for non-rehash commands when stash is almost full, assuming rehash commands have a weight of 1 (i.e., 50% of the commands are for rehashing) |

As can be seen from the table, there may be two watermark parameters and three weight parameters associated with the arbiter 290. The watermark parameters define the thresholds for different stash occupancies (e.g., occupancies of stash 220), and divide the stash occupancy into three regions—"normal," "highly occupied" and "almost full." The weight parameters then define the weights for rehash vs. non-rehash commands in each region. It should be noted however, that the present technology is not restricted to three regions. Any number of two or more regions may be employed, with a corresponding number of thresholds and any desired weights.

Figure 4:
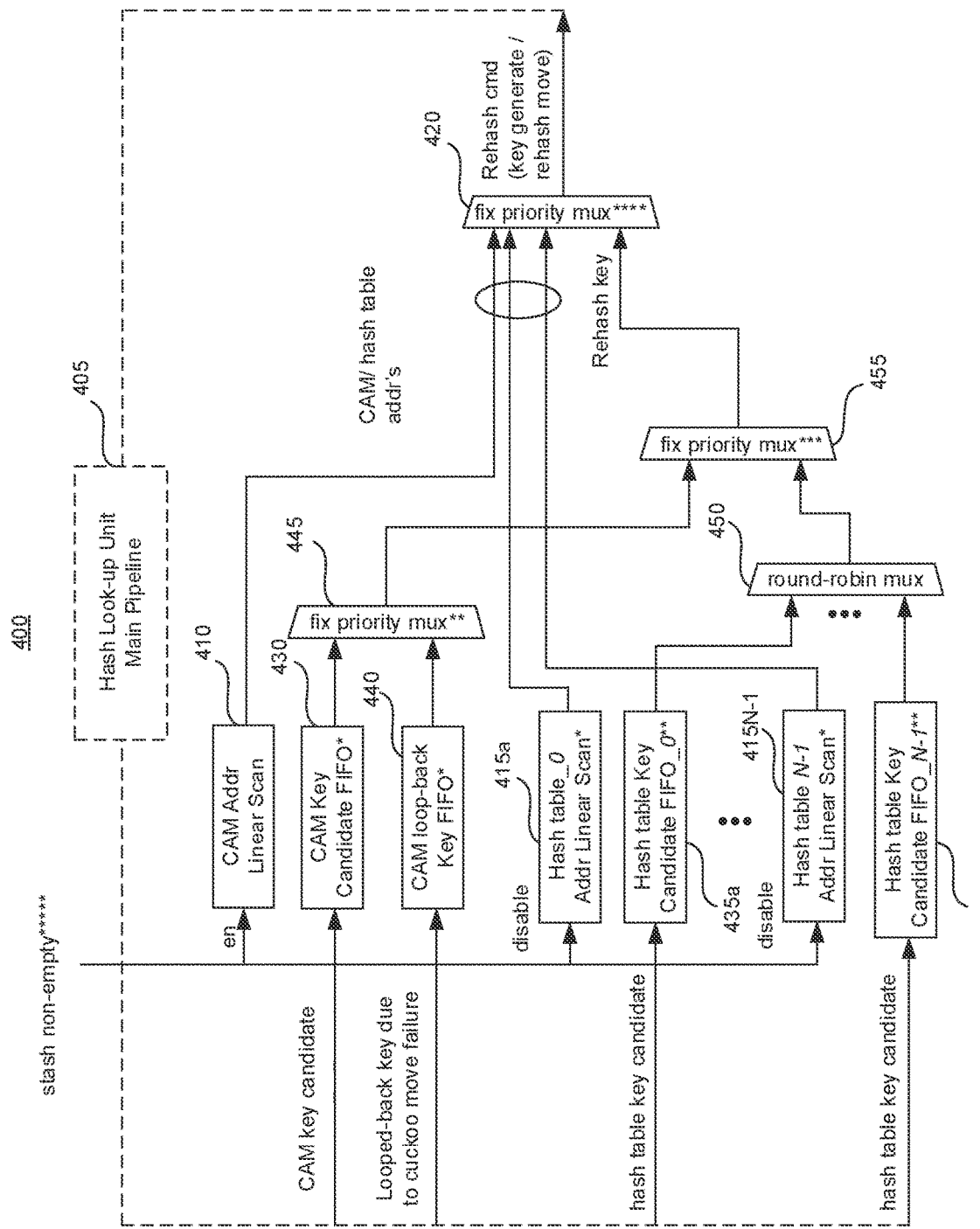
FIG. 4 is a block diagram of a background rehash engine of an embodiment.

Referring now to FIG. 4, the figure shows a block diagram of a background rehash engine 400 of an embodiment. The background rehash engine 400 generates rehash commands in the background. There are two types of rehashing moves: (i) cuckoo move—move a key-value pair from stash, e.g., from stash 220, back to the hash tables, e.g., hash tables 210 (higher priority), and (ii) rehashing within hash tables, e.g., within hash tables 210, to balance the occupancy across buckets, e.g., buckets 40a, and prevent hash collision (lower priority). The function of the background rehash engine 400 is to generate key candidates with high quality (i.e., candidates that can reduce the use of stash) as promptly as possible, so as to maximize the efficiency by which idle cycles are used for rehashing.

As can be seen from FIG. 4, rehashing commands then go through a hash lookup unit main pipeline 405 (e.g., the elements of system 200 other than the background rehash engine 280), and the rehashing results are looped back and serve as inputs to the unit 405. As can be further seen from the figure, a rehash command can be either one of the two following types—(i) rehash key generation or (ii) rehash move. During a key generation, an address is provided for each memory, including the CAM (e.g., CAM 225) and each of the hash tables (e.g., hash tables 210). Each memory reads content from the given address and generates its own key candidate independently. During a rehash move, a key is selected, and a rehash move is performed on the selected key.

Rehash moves always have a higher priority than key generations. So that selecting a key candidate for a rehash move will take precedence over generating a key candidate unless no key candidate currently exists. It is always a lower priority to generate new rehash key candidates. The assignment of relative priorities to generating keys and using keys for rehash moves may be performed by a first fixed priority multiplexer 420.

Regarding key generation, for each memory, rows are scanned in a linear order. The linear scanning operations of each of the CAM and hash tables, is indicated in FIG. 4 by CAM address linear scan block 410 and hash address linear scan blocks $415a$-$415_{N-1}$, respectively. If a scanned entry satisfies certain criteria, it becomes a rehash key candidate and the corresponding key is stored into a candidate first-in, first-out memory (FIFO). The candidate FIFOs for each of the CAM and hash tables, is indicated in FIG. 4 by Cam key candidate FIFO 430 and hash table key candidate FIFOs $435a$-$435_{N-1}$, respectively. For the CAM, the key of any valid (i.e., non-empty) entry is a candidate. For the each of the hash tables, any key in a full bucket is a candidate, because a full bucket potentially leads to a collision. In embodiments employing multiple cells per bucket (i.e., multiple key-value pairs per bucket), when a scanned bucket is full, a key from among the multiple keys in the bucket is selected at random to be a candidate and is stored into the corresponding FIFO.

Each CAM rehash key also has a failure count associated with it, to indicate how many cuckoo move failures have occurred for that CAM entry. The count is initialized to be 0, and increased every time there is a cuckoo move failure. In case of a cuckoo move failure, the CAM key-value pair associated with the rehash key is moved to the hash tables despite the failure, a key-value pair from the bucket into which the CAM key-value pair is moved (e.g., a key-value pair from a randomly selected cell of the bucket into which the CAM key-value pair is moved) is moved into the stash, and the key of the key-value pair moved into the stash is stored into a CAM loop-back key FIFO 440 as a looped-back key. A looped-back key always has a higher priority than CAM keys which have not yet been the subject of a cuckoo move attempt. In the FIG. 4 embodiment, the priority of looped-back keys over non-looped back CAM keys is implemented by a second fixed priority multiplexer 445. Notably, if the key of a failed cuckoo move was simply looped back, without the key being switched with a key from the hash tables—and without the attendant switching of key-value pairs between the hash tables and stash—it would be highly likely that an attempted rehash of the looped back key would fail again.

When the time of cuckoo move failures for a given key reaches a certain number (can be set by a control and status register, CSR) the entry is skipped. The entry will be re-tried for a cuckoo move when its address is next scanned. The failure count for the entry is also reset. The provision of the loop-back path and the looped-back keys increase rehashing performance and efficiency. This is because unlike other keys, the generation of looped-back keys does not require a memory read, and therefore saves memory bandwidth.

Other elements of the FIG. 4 configuration are a round-robin multiplexer 450 and a third fixed priority multiplexer 455. The round-robin multiplexer 450 is for selecting a key from among the next key in each of the hash table FIFOs $435a$-$435_{N-1}$. The third fixed priority multiplexer 455 selects from among the output of the round-robin multiplexer 450 and the output of the second fixed priority multiplexer 445, and provides the selection as input of the first fixed priority multiplexer 420. In this manner, the first fixed priority multiplexer 420 is enabled to select between a rehash candidate key to serve as a basis for a rehash move command and a memory address to serve as a basis for a key generation command. The second fixed priority multiplexer 445 and the third fixed priority multiplexer 455 act to enforce a strict priority among the key candidate FIFOs: CAM loop-back key FIFO 440>CAM key candidate FIFO 430>hash table key candidate FIFOs $435a$-$435_{N-1}$. In case that not every FIFO of FIFOs 440, 430 and $435a$-$435_{N-1}$ can provide a valid key candidate, only those FIFOs that can provide a valid candidate key participate in the selection.

In addition, the following notes are provided regarding the depiction of FIG. 4.

The depths of the FIFOs are equal to the end-to-end latency of the hash look-up unit to ensure that, in the extreme case, each key candidate of consecutively generated key candidates can be stored in a FIFO.

A looped-back key always has a higher priority.
A key candidate from CAM always has a higher priority.
A rehash key, if any, will always be selected for a rehash move. It is lower priority to generate new rehash keys.
Pause the scanning for hash tables if the stash becomes non-empty, to allow rehash to focus on cuckoo-move only.

Some of the advantages of the present technology include the following.

The proposed hash table lookup unit has a high throughput: an "update (i.e., install/uninstall)" or a "match" operation is accepted every cycle under normal operation.

"Install" operations can be completed within a fixed bounded time for worst case. If a collision occurs, an old entry is swapped into the stash. A background rehash engine will try to move the entry back to the hash tables using idle cycles. In order to guarantee the bounded latency, an "install" will not be accepted if the CAM is almost full. For example, when the CAM 220 is almost full an install request will be gated so that the request is not sent to the arbiter 290.

A dynamic minimum bandwidth is allocated for the background rehashing. The bandwidth is controlled by a weighted round-robin arbiter, and increases with the occupancy of the stash, in order to keep a low stash occupancy.

Rehash operations not only move entries from the stash back to the hash table, but also rebalance the occupancy across buckets to prevent hash collision.

The design unifies the data path for all types of operations—update, match, and rehash—and enables a simple and efficient design.

Embodiments of the present technology include, but are not restricted to, the following.

(1) A hash table system, including a plurality of hash tables, associated with respective hash functions, for storing key-value pairs; an overflow memory for storing key-value pairs moved from the hash tables due to collision; and an arbiter for arbitrating among commands including update commands for installing key-value pairs into the hash tables or uninstalling key-value pairs from the hash tables, match commands for matching keys to locations in the hash tables, and rehash commands for relocating key-value pairs from the overflow memory to the hash tables or relocating key-value pairs from one of the hash tables to another of the hash tables, wherein for each system clock cycle, the arbiter selects as a selected command one of an update command, a match command, or a rehash command, and wherein the hash table system completes execution of each selected command within a bounded number of system clock cycles.

(2) The system according to (1), wherein each hash table includes a plurality of buckets, and each bucket includes a plurality of cells, wherein each cell is operable to store a key-value pair, wherein each key hashes to one of the buckets in each hash table, and wherein when the system performs an install operation for a key-value pair, a bucket in each hash table is determined for the key-value pair to be stored by hashing the key with the respective hash functions, and the key-value pair is stored in a hash-table for which the determined bucket is not full.

(3) The system according to (2), wherein when all of the buckets determined for a key-value pair to be stored are full, a key-value pair previously stored in one of the determined buckets is evicted and stored in the overflow memory, and the key-value pair to be stored is stored in the bucket from which the key-value pair previously stored is evicted (4) The system according to (1), wherein the overflow memory is configured so that a location of a key-value pair stored in the overflow memory is determined by searching for the key of the key-value pair.

(5) The system according to (4), wherein the overflow memory includes a content addressable memory for storing keys of key-value pairs, and another memory for storing values of the key-value pairs.

(6) The system according to (1), wherein the arbiter is a weighted round-robin arbiter.

(7) The system according to (6), wherein a weight applied to commands that are not rehash commands is varied according to an occupancy level of the overflow memory.

(8) The system according to (7), wherein the weight applied to commands that are not rehash commands is set to a first value when the occupancy level of the overflow memory is less than a first threshold, is set to a second value greater than the first value when the occupancy level of the overflow memory is greater than the first threshold and less than a second threshold, and is set to a third value greater than the second value when the occupancy level of the overflow memory is greater than the second threshold.

(9) The system according to (8), wherein the first threshold is an overflow memory high occupied threshold, and the second threshold is an overflow memory almost full threshold.

(10) The system according to (1), wherein the rehash commands include two types of rehash commands, a candidate generation type of rehash command for selecting a key-value pair as a candidate key-value pair for relocating and storing the candidate key-value pair in another memory, and a move type of rehash command for attempting to relocate a candidate key-value pair.

(11) The system according to (10), wherein move type rehash commands are prioritized over candidate generation type rehash commands.

(12) The system according to (10), wherein when a plurality of keys corresponding to candidate key-value pairs is stored in one or more candidate memories and a move type rehash command is performed, a key for the move type rehash command is selected from the one or more candidate memories according to priority that prioritizes candidate keys corresponding to key-value pairs in the overflow memory over candidate keys corresponding key-value pairs in the hash tables.

(13) The system according to (10), wherein when a plurality of keys corresponding to candidate key-value pairs is stored in one or more candidate memories and a move type rehash command is performed on a candidate key-value pair in the overflow memory and fails, the candidate key-value pair is moved into a hash table location occupied by a selected key-value pair, the selected key-value pair is moved into the overflow memory, and the key corresponding to the selected key-value pair is designated as a looped-back key, and is stored in the one or more candidate memories.

(14) The system according to (13), wherein when a plurality of keys corresponding to candidate key-value pairs is stored in one or more candidate memories and a move type rehash command is performed, the candidate key-value pair for the move type rehash command is selected according to a priority that prioritizes looped-back keys over non looped-back keys.

(15) The system according to (1), wherein each of the key-value pairs includes a connection identifier as a key and a cache memory address as a value.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A hash table system, comprising a plurality of hash tables, associated with respective hash functions, for storing key-value pairs, wherein each hash table comprises a plurality of buckets, and each bucket comprises a plurality of cells, wherein each cell is operable to store a key-value pair, wherein each key hashes to one of the buckets in each hash table, and wherein when the system performs an install operation for a key-value pair, a bucket in each hash table is determined for the key-value pair to be stored by hashing the key with the respective hash functions, and the key-value pair is stored in a hash-table for which the determined bucket is not full, wherein when all of the buckets determined for a key-value pair to be stored are full, a key-value pair previously stored in one of the determined buckets is evicted and stored in an overflow memory, and the key-value pair to be stored is stored in the bucket from which the key-value pair previously stored is evicted.

2. The system according to claim 1, wherein the overflow memory is configured so that a location of a key-value pair stored in the overflow memory is determined by searching for the key of the key-value pair.

3. The system according to claim 2, wherein the overflow memory comprises a content addressable memory for storing keys of key-value pairs, and another memory for storing values of the key-value pairs.

4. The system according to claim 1, further comprising:
the overflow memory for storing key-value pairs moved from the hash tables due to collision; and
an arbiter for arbitrating among commands including update commands for installing key-value pairs into the hash tables or uninstalling key-value pairs from the hash tables, match commands for matching keys to locations in the hash tables, and rehash commands for relocating key-value pairs from the overflow memory to the hash tables or relocating key-value pairs from one of the hash tables to another of the hash tables,
wherein for each system clock cycle, the arbiter selects as a selected command one of an update command, a match command, or a rehash command, and
wherein the hash table system completes execution of each selected command within a bounded number of system clock cycles,
wherein the arbiter is a weighted round-robin arbiter.

5. The system according to claim 4, wherein a weight applied to commands that are not rehash commands is varied according to an occupancy level of the overflow memory.

6. The system according to claim 5, wherein the weight applied to commands that are not rehash commands is set to a first value when the occupancy level of the overflow memory is less than a first threshold, is set to a second value greater than the first value when the occupancy level of the overflow memory is greater than the first threshold and less than a second threshold, and is set to a third value greater than the second value when the occupancy level of the overflow memory is greater than the second threshold.

7. The system according to claim 6, wherein the first threshold is an overflow memory high occupied threshold, and the second threshold is an overflow memory almost full threshold.

8. The system according to claim 1, further comprising:
the overflow memory for storing key-value pairs moved from the hash tables due to collision; and
an arbiter for arbitrating among commands including update commands for installing key-value pairs into the hash tables or uninstalling key-value pairs from the hash tables, match commands for matching keys to locations in the hash tables, and rehash commands for relocating key-value pairs from the overflow memory to the hash tables or relocating key-value pairs from one of the hash tables to another of the hash tables,
wherein for each system clock cycle, the arbiter selects as a selected command one of an update command, a match command, or a rehash command, wherein the hash table system completes execution of each selected command within a bounded number of system clock cycles, and wherein the rehash commands comprise two types of rehash commands, a candidate generation type of rehash command for selecting a key-value pair as a candidate key-value pair for relocating and storing the candidate key-value pair in another memory, and a move type of rehash command for attempting to relocate a candidate key-value pair.

9. The system according to claim 8, wherein move type rehash commands are prioritized over candidate generation type rehash commands.

10. The system according to claim 8, wherein when a plurality of keys corresponding to candidate key-value pairs is stored in one or more candidate memories and a move type rehash command is performed, a key for the move type rehash command is selected from the one or more candidate memories according to priority that prioritizes candidate keys corresponding to key-value pairs in the overflow memory over candidate keys corresponding key-value pairs in the hash tables.

11. The system according to claim 8, wherein when a plurality of keys corresponding to candidate key-value pairs is stored in one or more candidate memories and a move type rehash command is performed on a candidate key-value pair in the overflow memory and fails, the candidate key-value pair is moved into a hash table location occupied by a selected key-value pair, the selected key-value pair is moved into the overflow memory, and the key corresponding to the selected key-value pair is designated as a looped-back key, and is stored in the one or more candidate memories.

12. The system according to claim 11, wherein when a plurality of keys corresponding to candidate key-value pairs is stored in one or more candidate memories and a move type rehash command is performed, the candidate key-value pair for the move type rehash command is selected according to a priority that prioritizes looped-back keys over non looped-back keys.

* * * * *